F. HIRSH.

ADJUSTING LOOP.

APPLICATION FILED MAR. 22, 1913.

Reissued Jan. 27, 1914. 13,680.

Fred Hirsh

Inventor:

by Wm. B. Whitney

Atty

Attest:

C. Mitchell

May Frevert.

UNITED STATES PATENT OFFICE.

FRED HIRSH, OF NEW YORK, N. Y., ASSIGNOR TO ADJUSTA COMPANY, A CORPORATION OF NEW YORK.

ADJUSTING-LOOP.

13,680. Specification of Reissued Letters Patent. Reissued Jan. 27, 1914.

Original No. 1,043,425, dated November 5, 1912, Serial No. 642,130. Application for reissue filed March 22, 1913. Serial No. 756,229.

*To all whom it may concern:*

Be it known that I, FRED HIRSH, a citizen of the United States, formerly residing in the city of New Haven, in the county of New Haven and State of Connecticut, and now residing in the city of New York, in the county and State of New York, have invented a certain new and useful Adjusting-Loop, of which the following is a specification.

My present invention relates to an adjusting loop, and has for its object to provide a simple, cheap, and efficient means for shortening and lengthening a strap, band, tape, or similar strip of flexible material intermediate its two ends.

The invention is illustrated in the accompanying drawing, in which—

Figure 1:
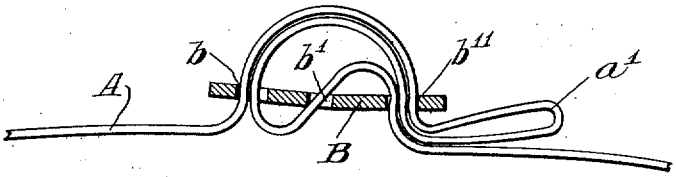
Figure 2:
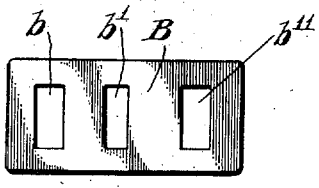

Figure 1 is a side view of the adjusting loop showing in section the plate by which such loop is formed and retained in the desired position and Fig. 2 is a plan view of the said plate.

As here shown, A is a strap or band and B is a plate, of bone, hard-rubber, metal, or other suitable, preferably rustless, material which is provided with three slots $b$ $b'$ $b''$. The strap is first passed through one of the end slots of the plate, $b''$ for example, back through the middle slot $b'$ and then is folded up into a loop $a'$ and this loop is carried through the end slot $b$ and back through the slot $b''$ outside of the length of strap therein.

It is evident that a pull upon the ends of the strap will bind the looped portion against the edges of the slot in the plate and securely hold it in position and that, when the pull is relaxed, the length of the looped portion of the strap and its position in the slot can be readily changed, thus shortening or lengthening the distance between its ends as desired. The looped portion of the strap may also be released by raising the end of the plate in which the slot $b''$ is formed.

The invention is particularly adapted for use as a waist-adjusting device for drawers, wash-vests, and similar articles of clothing, the ends of the strap either a single strap at the back or a strap at each of the opposite sides being sewed to the garment at suitable points on its waist-line.

While I have illustrated and described one specific embodiment of my invention it should be understood that the device can be modified in its several details, as by the substitution of mechanical equivalents, without departing from the spirit or sacrificing the advantages thereof.

What I claim as new, and desire to secure by Letters Patent, is—

1. The combination with a plate having three slots therein and a strip of flexible material which extends through one of the end slots and back through the middle slot of the plate of an adjusting loop formed in the said strip by folding it into a loop intermediate the middle slot of the plate and its adjacent end and passing said loop through the other end slot and back through the first mentioned end slot of the plate.

2. The combination with a plate having three slots therein of a strap of flexible material two sections of which are secured adjustably with respect to each other in said plate by having one section passed through one end slot then through the middle slot then through the other end slot and then back and again through the first slot and the other section passed once through each end slot outside of and over the first section.

FRED HIRSH.

In presence of—
WM. B. WHITNEY,
CYRUS BENSON.